US012151493B2

(12) United States Patent
Liang

(10) Patent No.: US 12,151,493 B2
(45) Date of Patent: Nov. 26, 2024

(54) AUXILIARY TOOL FOR STAMPING STAMP

(71) Applicant: Jian Liang, Walnut, CA (US)

(72) Inventor: Jian Liang, Walnut, CA (US)

( * ) Notice: Subject to any disclaimer, the term of this patent is extended or adjusted under 35 U.S.C. 154(b) by 0 days.

(21) Appl. No.: 18/459,988

(22) Filed: Sep. 1, 2023

(65) Prior Publication Data

US 2023/0406019 A1 Dec. 21, 2023

Related U.S. Application Data

(63) Continuation-in-part of application No. 17/855,906, filed on Jul. 1, 2022, now abandoned.

(60) Provisional application No. 63/217,418, filed on Jul. 1, 2021.

(51) Int. Cl.

| | |
|---|---|
| ***B41K 1/58*** | (2006.01) |
| ***B41K 1/00*** | (2006.01) |
| ***B44B 5/00*** | (2006.01) |

(52) U.S. Cl.

CPC ................ *B41K 1/003* (2013.01); *B41K 1/58* (2013.01); *B44B 5/0085* (2013.01)

(58) Field of Classification Search

CPC .......... B41K 1/003; B41K 1/36; B41K 1/006; B41K 1/02; B41K 1/06; B41K 3/36; B41K 3/40; B44B 5/0085; B44B 11/04

USPC .............................. 101/4, 18, 28, 29; 276/44

See application file for complete search history.

(56) References Cited

U.S. PATENT DOCUMENTS

| | | | | |
|---|---|---|---|---|
| 4,437,400 A * | 3/1984 | Ellis | B44B 5/0061 269/211 |
| 11,712,914 B1 * | 8/2023 | Wolter | B41K 1/40 101/260 |
| 2013/0092040 A1 * | 4/2013 | Exley | B41K 1/06 101/383 |

* cited by examiner

*Primary Examiner* — Leslie J Evanisko

(74) *Attorney, Agent, or Firm* — Tsz Lung Yeung

(57) ABSTRACT

An auxiliary tool includes a first stamping plate, a guiding frame, and a magnetic element. The first stamping plate is detachably attached on a first side wall of a container, and has a plurality of positioning grooves indently and spacedly formed on a first outer surface of the first stamping plate. The guiding frame has an engagement rim detachably engaging with one of the positioning grooves, and a supporting platform shaped and sized to correspond to the stamp. The magnetic element is mounted on the guiding frame to provide a magnetic attractive force for magnetically attracting the stamp so that a user is able to impart an impact on the stamp for forming a printed text on a workpiece.

18 Claims, 9 Drawing Sheets

AUXILIARY TOOL FOR STAMPING STAMP

CROSS REFERENCES OF RELATED APPLICATIONS

This is a Continuation-In-Part of a non-provisional application having an operation number of Ser. No. 17/855,906, and a filing date of Jul. 1, 2022, which claimed priority of a provisional patent application having an application No. 63/217,418, and a filing date of Jul. 1, 2021. The contents of these specifications are incorporated herein by reference.

BACKGROUND OF THE PRESENT INVENTION

Field of Invention

The present invention relates to stamping apparatus, and more particularly to an auxiliary tool for stamping stamps on a workpiece.

Description of Related Arts

Stamping stamps are widely used in machinery and equipment production information nameplates, jewelry, leather goods and other industries. Existing stamping stamp tools generally rely on visual alignment, and cannot ensure that the stamped text is neat and beautiful, and the text is not easy to align during work and is in operation. It is difficult to modify, so many stamped stamps on the market are not neat and unsightly, which greatly affects the work efficiency and quality of users.

SUMMARY OF THE PRESENT INVENTION

Certain variations of the present invention provide an auxiliary tool for stamping stamps on a workpiece.

Certain variations of the present invention provide an auxiliary tool for stamping stamps on a workpiece and with simple structure, less cost, and more convenient and ease of use.

Certain variations of the present invention provide a stamping assembly which comprises a container and a first stamping plate, wherein the first stamping plate is capable of detachably attached on the container for providing a positioning guide for a user to stamp on a working surface of an external object.

In one aspect of the present invention, it provides a stamping assembly, comprising:

a container having a receiving cavity for receiving at least one stamp, the container having a first side wall, a second side wall, and a bottom wall; and an auxiliary tool, which comprises:

a first stamping plate detachably attached on the first side wall of the container, the first stamping plate having a plurality of positioning grooves indently and spacedly formed on a first outer surface thereof;

a guiding frame having an engagement rim detachably engaging with one of the positioning grooves, and a supporting platform shaped and sized to correspond to the stamp; and at least one magnetic element mounted on the guiding frame to provide a magnetic attractive force for magnetically attracting the stamp so that a user is able to impart an impact on the stamp for forming a printed text on a workpiece.

In another aspect of the present invention, it provides an auxiliary tool for a container having a first side wall, a second side wall and a bottom wall, the auxiliary tool comprising:

a first stamping plate detachably attached on the first side wall of the container, the first stamping plate having a plurality of positioning grooves indently and spacedly formed on a first outer surface thereof;

a guiding frame having an engagement rim detachably engaging with one of the positioning grooves, and a supporting platform shaped and sized to correspond to the stamp; and at least one magnetic element mounted on the guiding frame to provide a magnetic attractive force for magnetically attracting the stamp so that a user is able to impart an impact on the stamp for forming a printed text on a workpiece.

This summary presented above is provided merely to introduce certain concepts and not to identify any key or essential features of the claimed subject matter.

DETAILED DESCRIPTIONS OF THE PRESENT INVENTION

Figure 1:
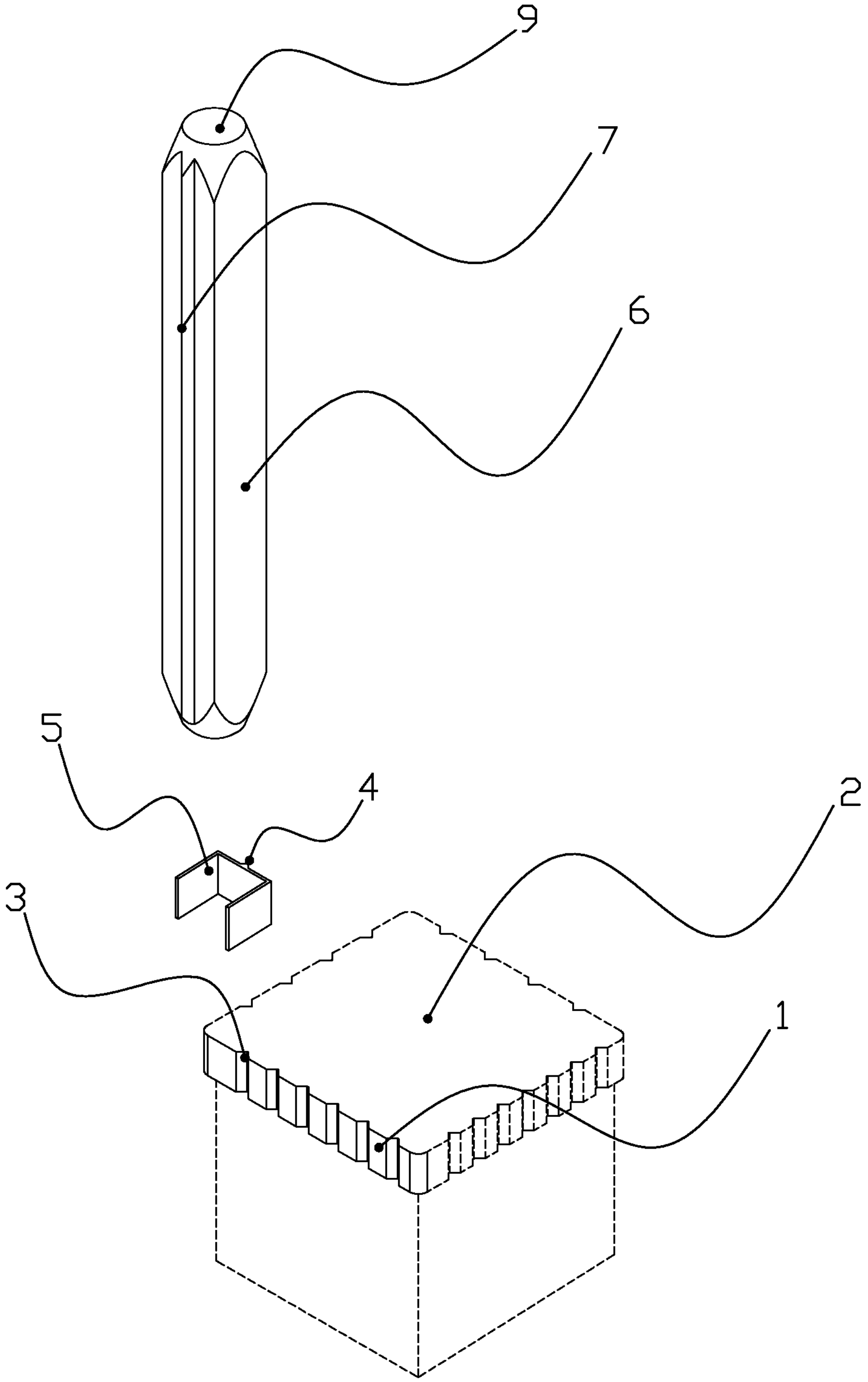
FIG. 1 is a schematic diagram of an auxiliary tool for stamping stamp work according to a first preferred embodiment of the present invention.

The following detailed description of the preferred embodiment is the preferred mode of carrying out the invention. The description is not to be taken in any limiting sense. It is presented for the purpose of illustrating the general principles of the present invention.

In the following descriptions, it should also be appreciated that the terms “arrange” and “set” in the following description refer to the connecting relationship in the accompanying drawings for easy understanding of the present invention. For example, the “arrange” and “set” may refer to one element directly or indirectly set or arrange on another element. Therefore, the above terms should not be an actual connection limitation of the elements of the present invention.

It should also be appreciated that the terms “center”, “length”, “width”, “thickness”, “top”, “bottom”, “front”, “rear”, “left”, “right”, vertical”, “horizontal”, “upper”, “lower”, “interior”, and “exterior” in the following description refer to the orientation or positioning relationship in the accompanying drawings for easy understanding of the present invention without limiting the actual location or orientation of the present invention. Therefore, the above terms should not be an actual location limitation of the elements of the present invention.

Moreover, it should be appreciated that the terms “first”, “second”, “one”, “a”, and “an” in the following description refer to “at least one” or “one or more” in the embodiment. In particular, the term “a” in one embodiment may refer to “one” while in another embodiment may refer to “more than one”. Therefore, the above terms should not be an actual numerical limitation of the elements of the present invention.

It should be appreciated that the terms “install”, “connect”, “couple”, and “mount” in the following description refer to the connecting relationship in the accompanying drawings for easy understanding of the present invention. For example, the connection may refer to permanent connection or detachable connection. Therefore, the above terms should not be an actual connection limitation of the elements of the present invention.

An auxiliary tool for stamping stamp work according to a first preferred embodiment is characterized in that a row of at least 2 equidistant grooves is provided on the subject, and this groove is connected to the raised structure of the stamping stamp or its auxiliary components It is consistent with each other, so as to achieve the function of setting the stamping stamp, and positioning the stamping seal in the card slot, thereby achieving the effect of forming the content of the stamping stamp on a working surface of an external object.

The pitch of the grooves will have a variety of sizes to meet most work requirements.

In summary, the beneficial effects of the present utility model relative to the prior art are:

In the present utility model, equidistant positioning grooves are provided on the main body, and a single finger can easily fix the stamping stamp or its parts in the groove to complete the positioning work, allowing the stamping stamp tool to easily complete different Spacing the text content, and keep the text neat, improve the quality and efficiency of the work.

An auxiliary tool for stamping stamps as shown in the figure includes a straight cube 2 with positioning grooves 3 with uniform distances on the front side. This groove can assist in keeping the printed text tidy during stamping stamp work. The purpose is to overcome the shortcomings in the prior art, and provide a simple structure, convenient work for stamping stamps, and making the stamped characters neat and beautiful.

FIG. 1 is a schematic diagram of the auxiliary tool for the stamping stamps which may include a main body 1, a straight cube 2, at least one positioning groove 3, an auxiliary component 5, an auxiliary component protruding structure 4, a stamping stamp unit 6, a stamping stamp unit protruding structure 7, and an impact bearing point 9.

Figure 2:
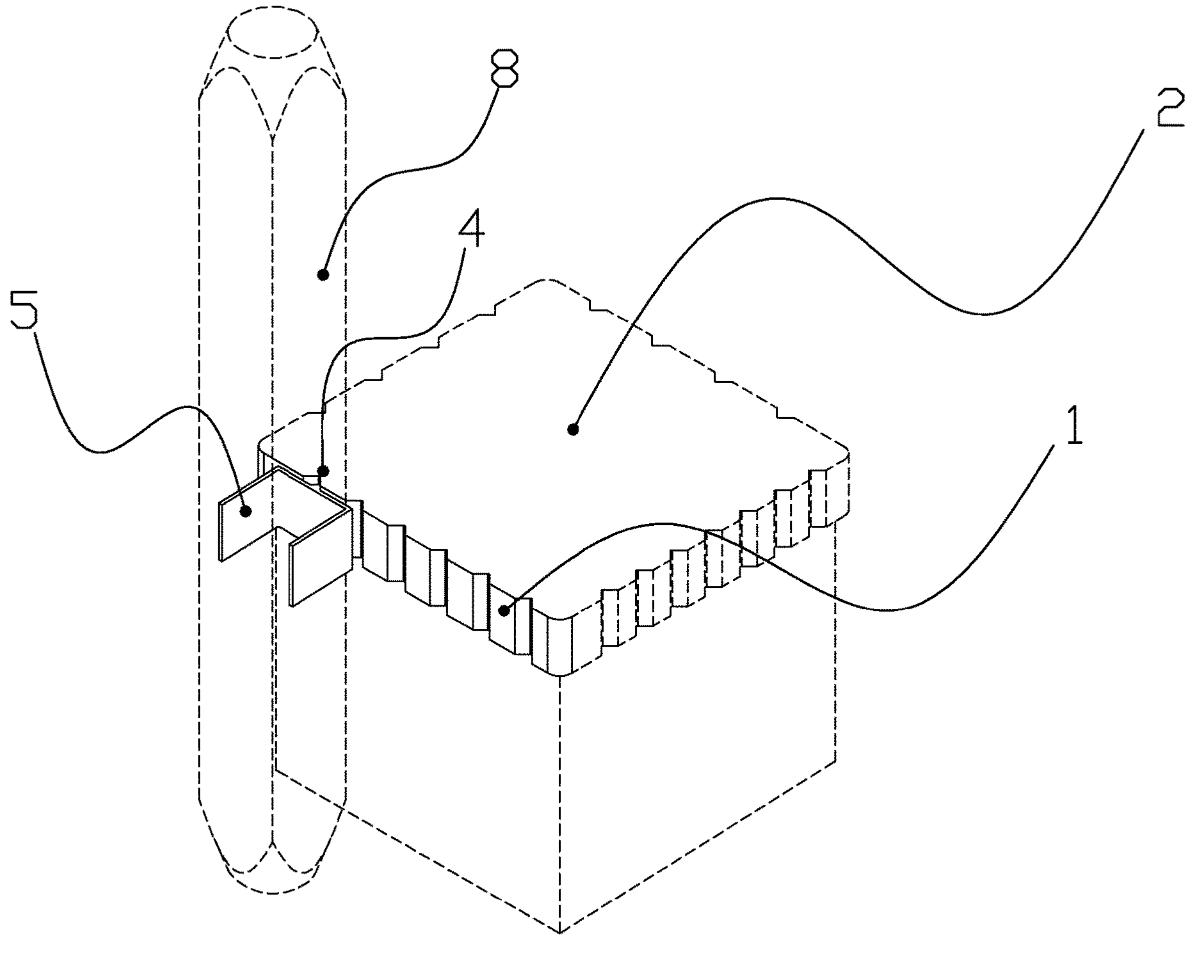
FIG. 2 is another schematic diagram of an auxiliary tool for stamping stamp work according to the first preferred embodiment of the present invention.
Figure 3:
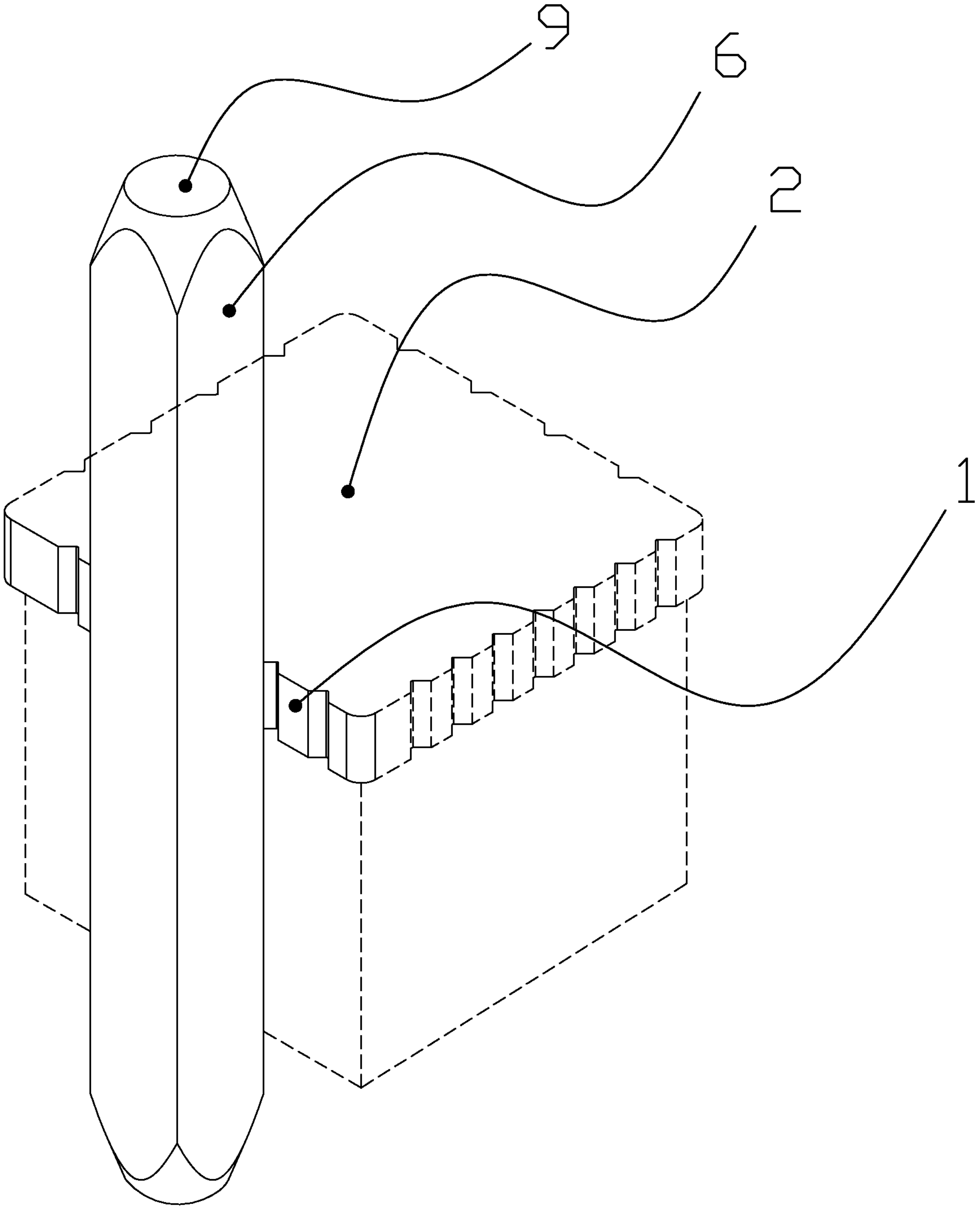
FIG. 3 is a schematic diagram of the auxiliary tool in use.
Figure 4:
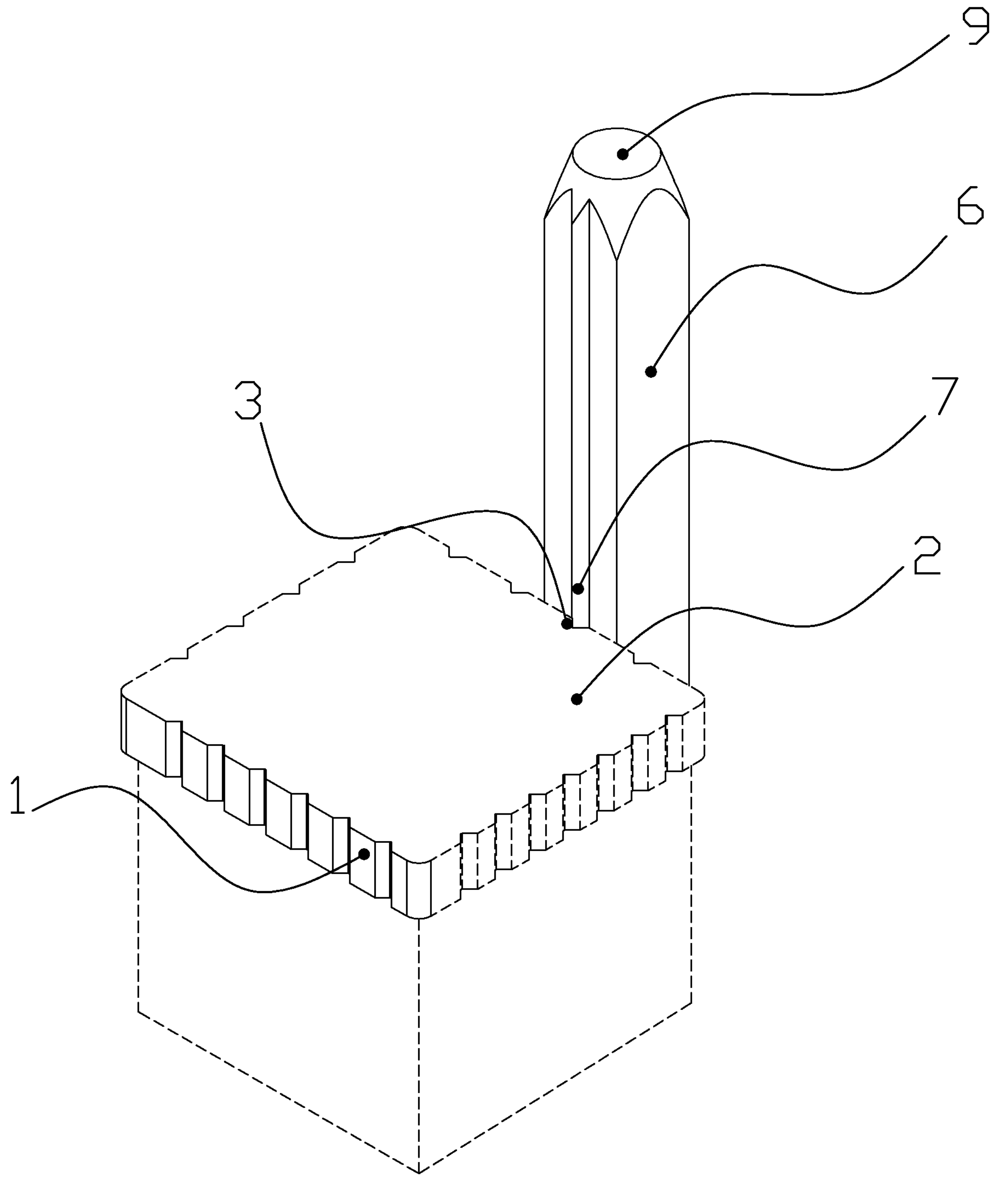
FIG. 4 is another schematic diagram of the utility model in use.
Figure 5:
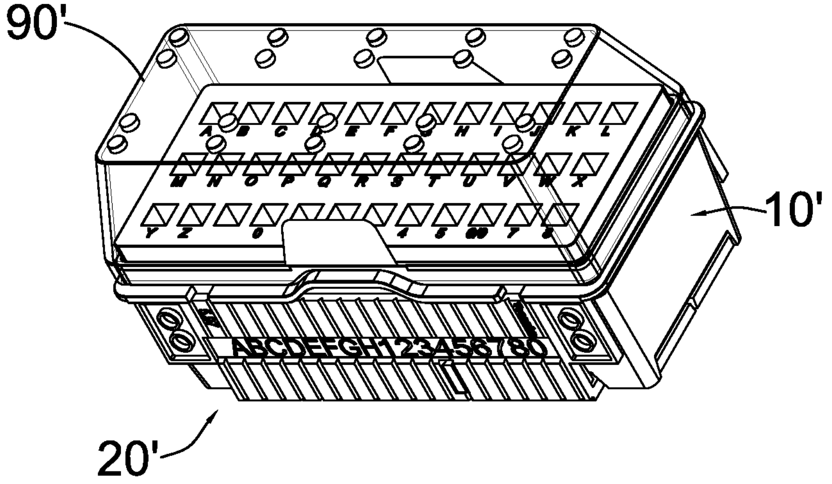
FIG. 5 is a schematic diagram of an auxiliary tool for stamping stamp work according to a second preferred embodiment of the present invention.

FIG. 2 is another schematic diagram of the of the auxiliary tool for the stamping stamps which may include a main body 1, a straight cube 2, a card slot recessed structure 3, an auxiliary component 5, a stamping stamp unit working with an auxiliary component protruding structure 4, a stamping stamp unit 6, a stamping stamp unit protruding structure 7, and a stamping stamp unit 8.

Referring to FIG. 5 to FIG. 12 of the drawings, a stamping assembly according to a second preferred embodiment of the present invention is illustrated. Broadly, the stamping assembly may comprise a container 10' and an auxiliary tool 20'.

The container 10' may have a receiving cavity 11' for receiving at least one stamp 80'. The container 10' may have a first side wall 12', a second side wall 13' and a bottom wall 14'.

The auxiliary tool 20' may comprise a first stamping plate 21', a guiding frame 25' and at least one magnetic element 26'. The first stamping plate 21' may be detachably attached on the first side wall 12'. The first stamping plate 21' may have a plurality of positioning grooves 211' indently and spacedly formed on a first outer surface 212' of the first stamping plate 21'.

The guiding frame 25' may have an engagement rim 251' detachably engaging with one of the positioning grooves 211', and a supporting platform 252' shaped and sized to correspond to the stamp 80'.

The magnetic element 26' may be mounted on the guiding frame 25' to provide a magnetic attractive force, wherein the stamp 80' is arranged to be magnetically attracted on the supporting platform 252' so that a user is able to impart an impact on the stamp 80' for forming a printed text on a workpiece.

According to the second preferred embodiment of the present invention, the container 10' may have a cubic structure having a rectangular or square cross-sectional shape when viewed from the top. The container 10' may have a receiving cavity 11' for receiving a plurality of (but at least one) stamps 80'. The container 10' may further comprise a supporting rack 15' detachably received in the receiving cavity 11' for individually supporting the stamps 80' in an upright manner.

Figure 6:
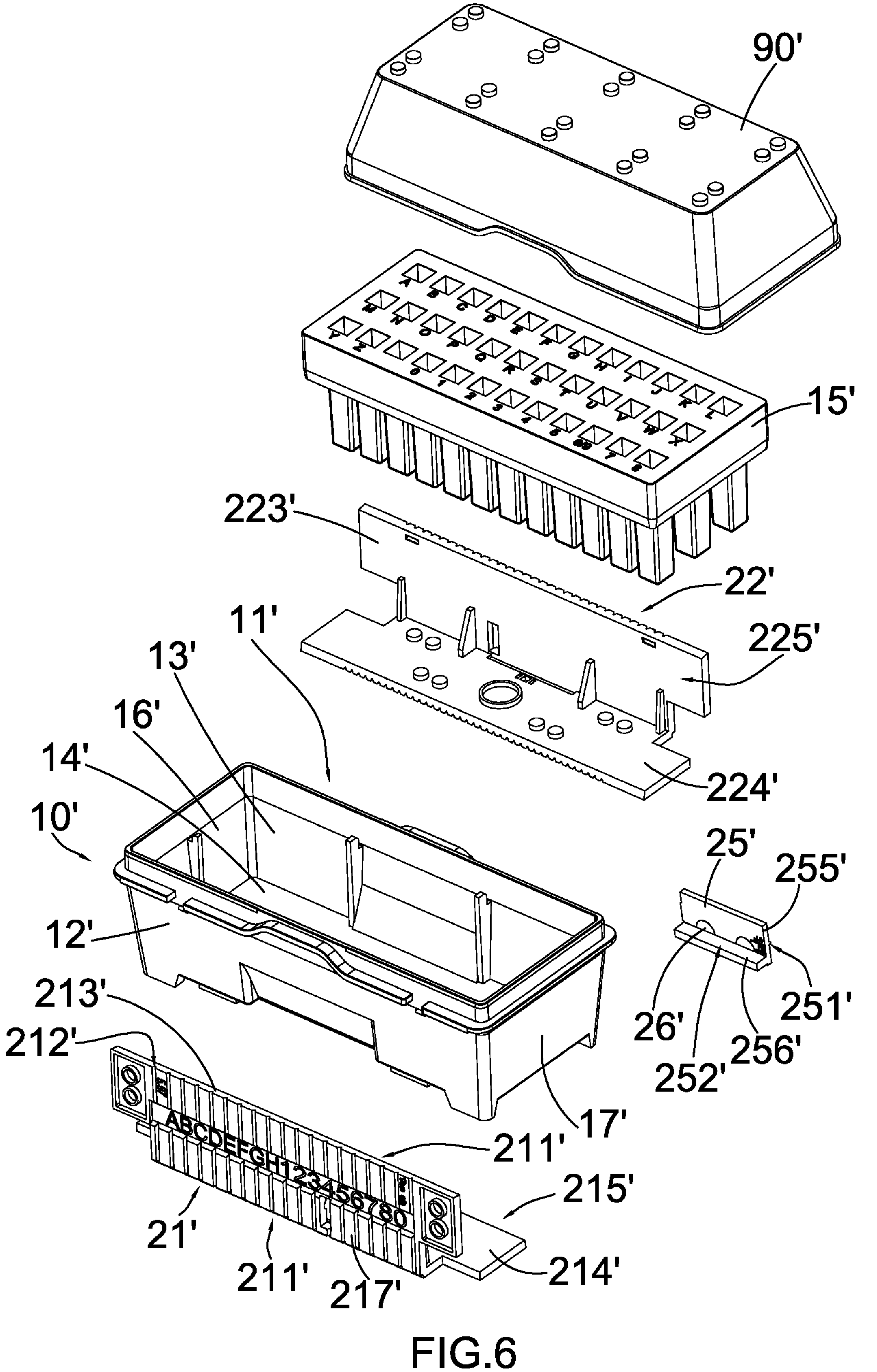
FIG. 6 is an exploded perspective view of the auxiliary tool for stamping stamp work according to a second preferred embodiment of the present invention.

As shown in FIG. 6 of the drawings, the first side wall 12' and the second side wall 13' may be opposite to each other. In the second preferred embodiment of the present invention, each of the first side wall 12' and the second side wall 13' may extend along a longitudinal direction of the container 10'. The container 10' may further have a third side wall 16' and a fourth side wall 17'. The third side wall 16' and the fourth side wall 17' may be opposite to each other and extend along a transverse direction of the container 10'.

Moreover, the first side wall 12', the second side wall 13', the third side wall 16' and the fourth side wall 17' may upwardly and peripherally extend from the bottom wall 14' to form a cubic structure of the container 10', wherein the receiving cavity 11' may be formed in a space surrounded by the first side wall 12', the second side wall 13', the third side wall 16' and the fourth side wall 17'. It is of course worth mentioning that the container 10' may form any cross-sectional shape depending on the circumstances in which it is used or manufactured.

Figure 8:
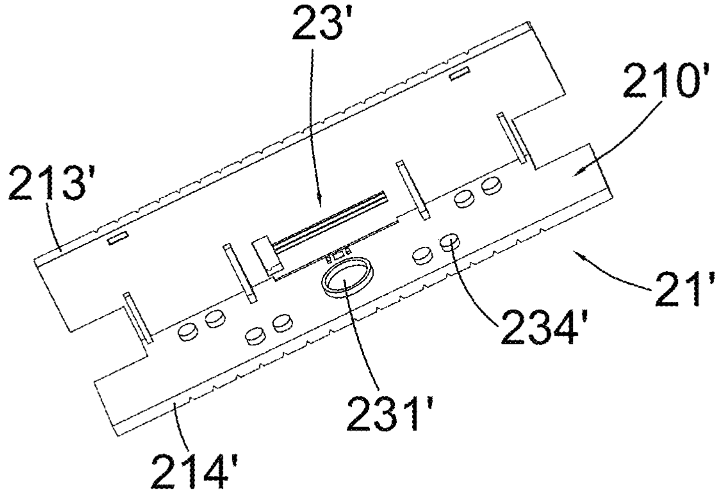
FIG. 8 is another schematic diagram of the first stamping plate of the auxiliary tool according to the second preferred embodiment of the present invention, illustrating an inner side of the first stamping plate.

As shown in FIG. 6 and FIG. 8 of the drawings, the first stamping plate 21' may have a first plate member 213' and a second plate member 214' integrally extending from the first plate member 213' to form a substantially L-shaped structure. The positioning grooves 211' may be spacedly formed on the first plate member 213' and the second plate member 214'. The first plate member 213' and the second plate member 214' may be detachably attached on the first side wall 12' and the bottom wall 14' respectively. According to the second preferred embodiment of the present invention, a distance between each two positioning grooves 211' on the first plate member 213' may be different from that of the second plate member 214' so that each of the first plate member 213' and the second plate member 214' may be utilized to produce stamps of different widths.

Figure 7:
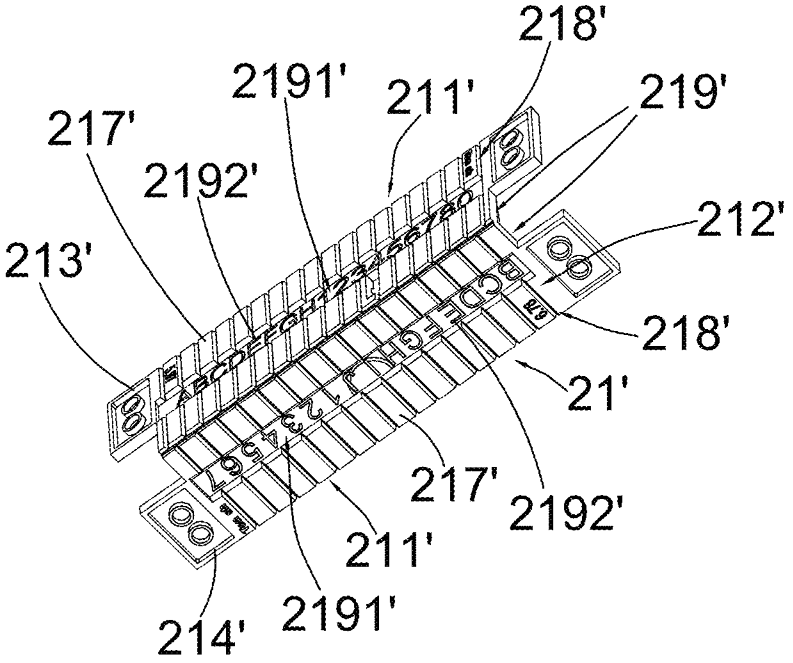
FIG. 7 is a schematic diagram of a first stamping plate of the auxiliary tool according to the second preferred embodiment of the present invention, illustrating an outer side of the first stamping plate.

Each of the first plate member 213' and the second plate member 214' may be divided into a first outer portion 218', a first inner portion 219' and a first mid portion 2191' formed between the first outer portion 218' and the first inner portion 219'. The first stamping plate 21' may further comprise a plurality of first positioning blocks 217' protruding from the first plate member 213' and the second plate member 214', wherein each positioning groove 211' of the first stamping plate 21' may be formed between each two adjacent first positioning blocks 217'. As shown in FIG. 7 of the drawings, the first positioning blocks 217' may be arranged to form two rows on the first outer portion 218' and the first inner portion 219' of the first plate member 213' respectively. The first positioning blocks 217' may also be arranged to form two rows on the first outer portion 218' and the first inner portion 219' of the second plate member 214' respectively.

The first stamping plate 21' may further comprise a plurality of first markings 2192' spacedly formed on the first mid portion 2191' of the first plate member 213' and the second plate member 214'. It is worth mentioning that each of the positioning grooves 211' formed on the first outer portion 218' is corresponding to the positioning groove 211' formed on the first inner portion 219' so that a stamp 80' or the engagement rim 251' of the guiding frame 25' may be allowed to detachably engage with the two corresponding positioning grooves 211' for producing a stamp on a workpiece.

Figure 11:
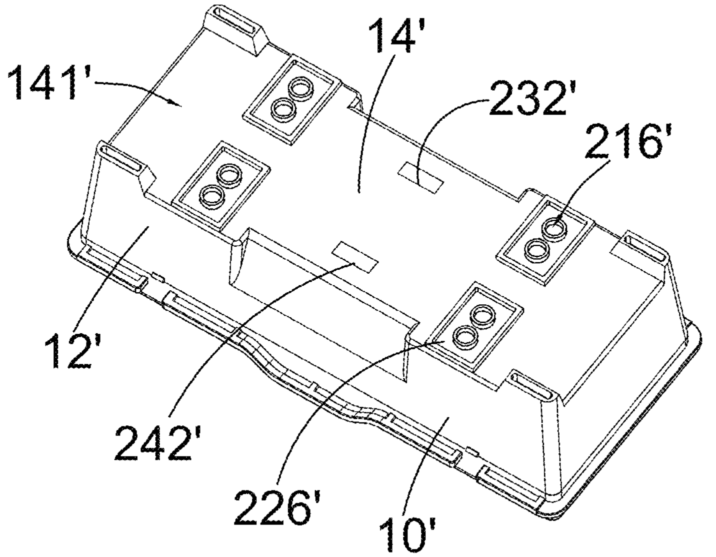
FIG. 11 is a bottom perspective view of a container of the auxiliary tool according to the second preferred embodiment of the present invention.

Referring to FIG. 8 and FIG. 11 of the drawings, the auxiliary tool 20' may further comprise a first connector 23' arranged to detachably connect the first stamping plate 21' to the container 10'. The first connector 23' may take a wide variety of forms, and the goal is to detachably connect the first stamping plate 21' to the container 10'. In one embodiment, the first connector 23' may comprise at least one first magnetic member 231' and a second magnetic member 232' attached on a first inner surface 210' of the first stamping plate 21' and an outer surface of the container 10', wherein the first magnetic member 231' may magnetically attract to the second magnetic member 232'. Thus, the first magnetic member 231' may be configured as a magnet, while the second magnetic member 232' may be configured from metallic material such as an iron piece. Alternatively, the container 10' may be configured from iron so that the first magnetic member 231' may be magnetically attracted to the container 10' without the need to mount the second magnetic member 232'.

As shown in FIG. 8 and FIG. 11 of the drawings, as an addition or an alternative, the first connector 23' may comprise at least one first protrusion 234' formed on a first inner surface 210' of the first stamping plate 21', and at least one mounting slot 216' formed on a bottom surface 141' of the bottom wall 14' of the container 10', wherein the first protrusion 234' is positioned to correspond to the mounting slot 216' so that the first protrusion 234' may fittedly and detachably engage with the mounting slot 216' for detachably mounting the first stamping plate 21' on the first side wall 12' of the container 10'. Note that the position of the first protrusion 234' and the mounting slot 216' may be interchanged to facilitate the same detachable attachment between the first side wall 12' of the container 10' and the first stamping plate 21'. Thus, the first protrusion 234' may be formed on the bottom wall 14' while the mounting slot 216' may be formed on the first stamping plate 21'.

When the first stamping plate 21' is attached on the container 10', the first plate member 213' may be detachably attached on the first side wall 12', while the second plate member 214' may extend underneath the bottom wall 14' of the container 10'.

Figure 9:
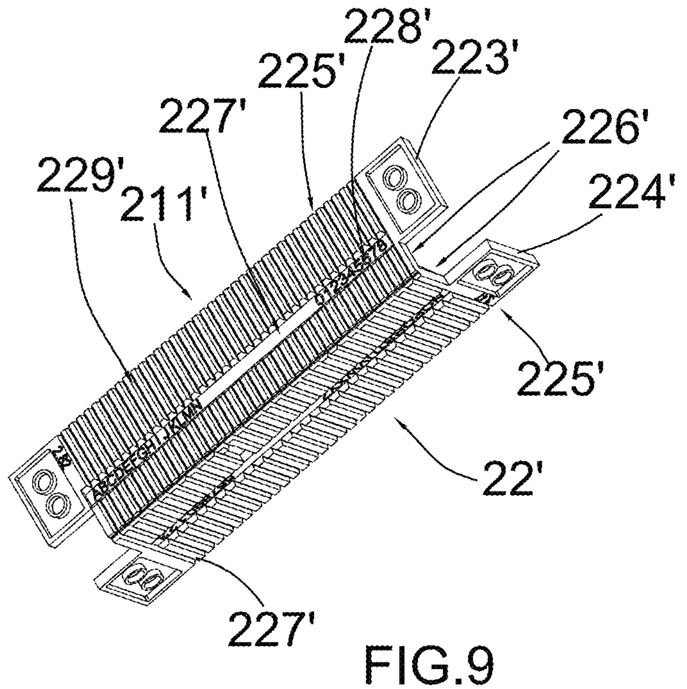
FIG. 9 is a schematic diagram of a second stamping plate of the auxiliary tool according to the second preferred embodiment of the present invention, illustrating an outer side of the first stamping plate.
Figure 10:
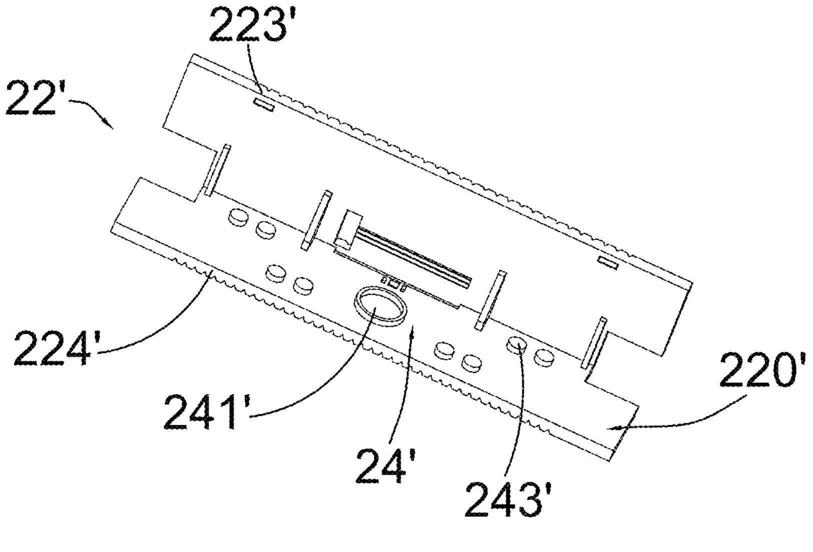
FIG. 10 is another schematic diagram of the second stamping plate of the auxiliary tool according to the second preferred embodiment of the present invention, illustrating an inner side of the second stamping plate.

As shown in FIG. 6, FIG. 9 and FIG. 10 of the drawings, the auxiliary tool 20' may comprise a second stamping plate 22' detachably attached on the second side wall 13' of the container 10'. The second stamping plate 22' may also have a plurality of positioning grooves 211' indently and spacedly formed on the second stamping plate 22'. The stamp 80' or the engagement rim 251' of the guiding frame 25' may be arranged to detachably engage with one of the positioning grooves 211' so that a user is able to impart impact on the stamping stamp as guided by the corresponding positioning grooves 211' for forming a printed text on a workpiece.

The second stamping plate 22' may have a third plate member 223' and a fourth plate member 224' integrally extending from the third plate member 223' to form a substantially L-shaped structure. The positioning grooves 211' may be spacedly formed on the third plate member 223' and the fourth plate member 224'. The third plate member 223' and the fourth plate member 224' may be detachably attached on the second side wall 13' and the bottom wall 14' respectively. A distance between each two positioning grooves 211' on the third plate member 223' may be different from that of the fourth plate member 224' so that each of the third plate member 223' and the fourth plate member 224' may be utilized to produce stamps of different widths.

Each of the third plate member 223' and the fourth plate member 224' may be divided into a second outer portion 225', a second inner portion 226' and a second mid portion 227' formed between the second outer portion 218' and the second inner portion 219'. The second stamping plate 22' may further comprise a plurality of second positioning blocks 229' protruding from the third plate member 223' and the fourth plate member 224', wherein each positioning groove 211' of the second stamping plate 22' may be formed between each two adjacent second positioning blocks 229'. As shown in FIG. 9 of the drawings, the second positioning blocks 229' may be arranged to form two rows on the second outer portion 225' and the second inner portion 226' of the third plate member 223' respectively. The second positioning blocks 229' may also be arranged to form two rows on the second outer portion 225' and the second inner portion 226' of the fourth plate member 224' respectively.

The second stamping plate 22' may further comprise a plurality of second markings 228' spacedly formed on the second mid portion 227' of the third plate member 223' and the fourth plate member 224'. It is worth mentioning that each of the positioning grooves 211' formed on the second outer portion 225' is corresponding to the positioning groove 211' formed on the second inner portion 226' so that the stamp 80' or the engagement rim 251' of the guiding frame

25' may be allowed to detachably engage with the two corresponding positioning grooves 211' for producing a stamp on the workpiece.

From the forgoing descriptions, the stamp 80' may be sufficiently guided by two corresponding positioning grooves 211' through the use of the guiding frame 25' which may extend through the corresponding plate member (i.e. first through fourth plate members 213', 214', 223', 224') along a transverse direction thereof so as to maximize contact area between the stamp 80' and the corresponding plate member 213', 214', 223', 224'. Thus, each of the positioning grooves 211' may maximally guide the corresponding stamp 80' by maximally restricting a collateral movement between the stamp 80' and the corresponding plate member 213', 214', 223', 224'.

The auxiliary tool 20' may further comprise a second connector 24' arranged to detachably connect the second stamping plate 22' to the container 10'. The second connector 24' may take a wide variety of forms, and the goal is to detachably connect the second stamping plate 22' to the container 10'.

In one embodiment, the second connector 24' may comprise at least one third magnetic member 241' and a fourth magnetic member 242' attached on an inner surface 220' of the second stamping plate 22' and an outer surface of the container 10', wherein the third magnetic member 241' may magnetically attract to the fourth magnetic member 242'. Thus, the third magnetic member 241' may be configured as a magnet, while the fourth magnetic member 242' may be configured from metallic material such as an iron piece. Alternatively, the container 10' may be configured from iron so that the third magnetic member 241' may be magnetically attracted to the container 10' without the need to mount the fourth magnetic member 242'.

As shown in FIG. 10 and FIG. 11 of the drawings, as an addition or an alternative, the second connector 24' may comprise at least one second protrusion 243' formed on an inner surface 220' of the second stamping plate 22', and at least one second mounting slot 226' formed on the bottom surface 141' of the bottom wall 14' of the container 10', wherein the second protrusion 243' is positioned to correspond to the second mounting slot 226' so that the second protrusion 243' may fittedly and detachably engage with the second mounting slot 226' for detachably mounting the second stamping plate 22' on the second side wall 13' of the container 10'. Note that the position of the second protrusion 243' and the second mounting slot 226' may be interchanged to facilitate the same detachable attachment between the second side wall 13' of the container 10' and the second stamping plate 22'. Thus, the second protrusion 243' may be formed on the bottom wall 14' while the second mounting slot 226' may be formed on the second stamping plate 22'.

When the first stamping plate 21' is attached on the container 10', the first plate member 213' may be detachably attached on the first side wall 12', while the second plate member 214' may extend underneath the bottom wall 14' of the container 10'.

It is worth mentioning that the positioning grooves 211' formed on the first stamping plate 21' and the second stamping plate 22' may have different distances apart from each other so as to allow a user to select the most appropriate distances between each stamp.

Figure 12:
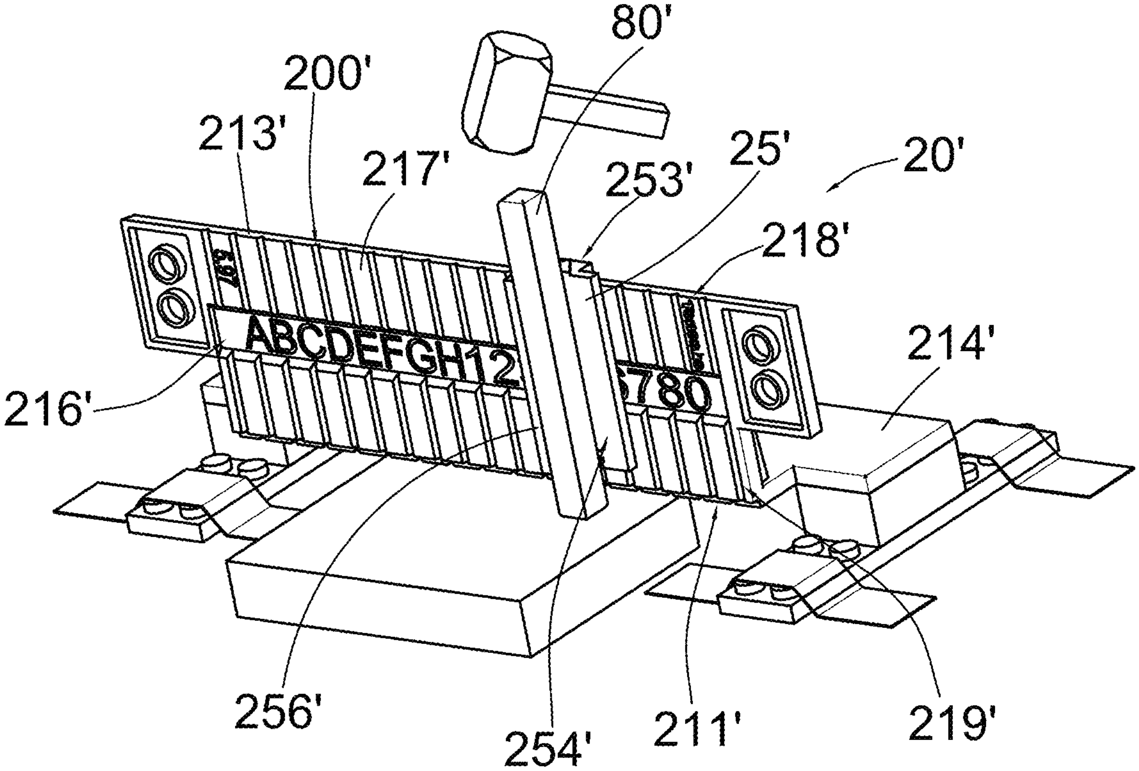
FIG. 12 illustrates an actual operation of the auxiliary tool for stamping stamp work according to a second preferred embodiment of the present invention.

As mentioned above, the auxiliary tool 20' may further comprise at least one guiding frame 25' and a magnetic element 26' supported on the guiding frame 25', wherein the guiding frame 25' may be detachably mounted on an inner surface 210' (220') of one of the first stamping plate 21' and the second stamping plate 22'. The guiding frame 25' may be configured as having an elongated structure and may have the engagement rim 251' extending along a longitudinal direction of the guiding frame 25'. The engagement rim 251' may be arranged to fittedly engage with one of the positioning grooves 211' as shown in FIG. 12 of the drawings.

The guiding frame 25' may be detachably mounted on one of the first stamping plate 21' and the second stamping plate 22'. In one embodiment, the auxiliary tool 20' may comprise two guiding frames 25' detachably mounted on inner surfaces 210', 220' of the first stamping plate 21' and the second stamping plate 22' respectively. The guiding frame 25' may have an elongated structure. As shown in FIG. 6 and FIG. 12 of the drawings, the guiding frame 25' may comprise a main panel 255', a biasing panel 256' outwardly extending from the main panel 255' to form a L-shaped structure constituting the supporting platform 252' at an outer side 254' of the guiding frame 25', wherein the engagement rim 251' may extend from the main panel 255' at an opposite direction of the biasing panel 256'. The magnetic element 26' may be configured as a magnet and may be embedded or mounted in the main panel 255' to produce magnetic force on the supporting platform 252'. The guiding frame 25' may further have a top mounting portion 253' detachably mounted on a corresponding outer side edge 200' of the first stamping plate 21' and/or the second stamping plate 22'.

The operation of the present invention is as follows: the stamps 80' may be received in the container 10' for easy storage and carrying. A lid 90' may be provided on the container 10' for enclosing the receiving cavity 11'. The first stamping plate 21' and the second stamping plate 22' may be detachably attached on the first side wall 12' and the second side wall 13' of the container 10' respectively through the first connector 23' and the second connector 24'.

The user may be able to utilize the first stamping plate 21' and the second stamping plate 22' for stamping stamps on an external object through the use of the guiding frame 25'. The user may take out a suitable stamp 80' from the receiving cavity 11' and align it on the supporting platform 252'. The stamp 80' may be magnetically attracted by the magnetic element 26' so that the position of the stamp 80' on the supporting platform 252' may be secured by magnetic force. At the same time, the engagement rim 251' may be engaged with one of positioning grooves 211'.

Since the distance between each two adjacent positioning grooves 211' for each of the first plate member 213', the second plate member 214', the third plate member 223' and the fourth plate member 224' may be different, the user may choose the most suitable plate member for stamping. The user may simply exert a downward impact force to put a stamping mark on a workpiece placed underneath the stamp 80'. When a particular stamping process is completed, a user may manually move the guiding frame 25' and the stamp 80' (or use another stamp 80' from the receiving cavity 11') to the next corresponding positioning grooves 211' for producing another stamping mark on the workpiece. These processes may continue until the user has completed stamping on the workpiece. After that, the user may put all stamps 80' back to the receiving cavity 11' for carrying or storage.

One skilled in the art may appreciate that by using the guiding frame 25' with the magnetic elements 26', a user is able to easily and conveniently adjust the position of the stamp 80', and the stamps thus produced will be more accurate as compared to conventional arts. Moreover, the first connector 23' and the second connector 24' may allow a user to easily and conveniently accommodate the first stamping plate 21' and the second stamping plate 22' on the container 10'.

The present invention, while illustrated and described in terms of a preferred embodiment and several alternatives, is not limited to the particular description contained in this specification. Additional alternative or equivalent components could also be used to practice the present invention.

What is claimed is:

1. A stamping assembly, comprising:

a container having a receiving cavity for receiving at least one stamp, the container having a first side wall, a second side wall, and a bottom wall; and an auxiliary tool, which comprises:

a first stamping plate detachably attached on the first side wall of the container, the first stamping plate having a plurality of positioning grooves indently and spacedly formed on a first outer surface thereof;

a guiding frame having an engagement rim detachably engaging with one of the positioning grooves, and a supporting platform shaped and sized to correspond to the at least one stamp; and at least one magnetic element mounted on the guiding frame to provide a magnetic attractive force for magnetically attracting the at least one stamp so that a user is able to impart an impact on the at least one stamp for forming a printed text on a workpiece.

2. The stamping assembly, as recited in claim 1, wherein the first stamping plate has a first plate member and a second plate member integrally extending from the first plate member to form a substantially L-shaped structure, the positioning grooves being spacedly formed on at least one of the first plate member and the second plate member.

3. The stamping assembly, as recited in claim 2, wherein the guiding frame comprises a main panel, a biasing panel outwardly extending from the main panel to form a L-shaped structure constituting the supporting platform at an outer side of the guiding frame, wherein the engagement rim extends from the main panel at an opposite direction of the biasing panel.

4. The stamping assembly, as recited in claim 3, wherein each of the first plate member and the second plate member is divided into a first outer portion, a first inner portion and a first mid portion formed between the first outer portion and the first inner portion, the first stamping plate further comprising a plurality of first positioning blocks protruding from the first plate member and the second plate member, wherein each positioning groove of the first stamping plate are formed between each two adjacent first positioning blocks.

5. The stamping assembly, as recited in claim 4, wherein the auxiliary tool further comprises a first connector arranged to detachably connect the first stamping plate to the container, the first connector comprising at least one first protrusion formed on one of a first inner surface of the first stamping plate, an outer surface of the container, and at least one first mounting slot formed on the other of the first inner surface of the first stamping plate and the outer surface of the container, the at least one first protrusion being positioned to correspond to that of the at least one first mounting slot so that the at least one first protrusion is capable of fittedly and detachably engaging with the at least one first mounting slot for detachably mounting the first stamping plate on the first side wall of the container.

6. The stamping assembly, as recited in claim 5, wherein the auxiliary tool further comprises a second stamping plate detachably attached on the second side wall of the container, the second stamping plate having a plurality of positioning grooves indently and spacedly formed on the second stamping plate.

7. The stamping assembly, as recited in claim 6, wherein the second stamping plate has a third plate member and a fourth plate member integrally extending from the third plate member to form a substantially L-shaped structure, the positioning grooves being spacedly formed on the third plate member and the fourth plate member.

8. The stamping assembly, as recited in claim 7, wherein each of the third plate member and the fourth plate member is divided into a second outer portion, a second inner portion and a second mid portion formed between the second outer portion and the second inner portion, the second stamping plate further comprising a plurality of second positioning blocks protruding from the third plate member and the fourth plate member, wherein each positioning groove of the second stamping plate is formed between each two adjacent second positioning blocks.

9. The stamping assembly, as recited in claim 8, wherein the auxiliary tool further comprises a second connector arranged to detachably connect the second stamping plate to the container, the second connector comprising at least one second protrusion formed on one of an inner surface of the second stamping plate, an outer surface of the container, and at least one second mounting slot formed on the other of an inner surface of the second stamping plate and an outer surface of the container, the at least one second protrusion being positioned to correspond to that of the at least one second mounting slot so that the at least one second protrusion is capable of fittedly and detachably engaging with the at least one second mounting slot for detachably mounting the second stamping plate on the second side wall of the container.

10. An auxiliary tool for use with a stamp and for a container having a first side wall, a second side wall and a bottom wall, the auxiliary tool comprising:

a first stamping plate detachably attached on the first side wall of the container, the first stamping plate having a plurality of positioning grooves indently and spacedly formed on a first outer surface thereof;

a guiding frame having an engagement rim detachably engaging with one of the positioning grooves, and a supporting platform shaped and sized to correspond to the stamp; and at least one magnetic element mounted on the guiding frame to provide a magnetic attractive force for magnetically attracting the stamp so that a user is able to impart an impact on the stamp for forming a printed text on a workpiece.

11. The auxiliary tool, as recited in claim 10, wherein the first stamping plate has a first plate member and a second plate member integrally extending from the first plate member to form a substantially L-shaped structure, the positioning grooves being spacedly formed on at least one of the first plate member and the second plate member.

12. The auxiliary tool, as recited in claim 11, wherein the guiding frame comprises a main panel, a biasing panel outwardly extending from the main panel to form a L-shaped structure constituting the supporting platform at an outer side of the guiding frame, wherein the engagement rim extends from the main panel at an opposite direction of the biasing panel.

13. The auxiliary tool, as recited in claim 12, wherein each of the first plate member and the second plate member is divided into an outer portion, an inner portion and a mid portion formed between the outer portion and the inner portion, the first stamping plate further comprising a plurality of first positioning blocks protruding from the first plate member and the second plate member, wherein each positioning groove of the first stamping plate are formed between each two adjacent first positioning blocks.

14. The auxiliary tool, as recited in claim 13, wherein the auxiliary tool further comprises a first connector arranged to detachably connect the first stamping plate to the container, the first connector comprising at least one first protrusion formed on one of an inner surface of the first stamping plate, an outer surface of the container, and at least one first mounting slot formed on the other of an inner surface of the first stamping plate and an outer surface of the container, the at least one first protrusion being positioned to correspond to that of the at least one first mounting slot so that the at least one first protrusion is capable of fittedly and detachably engaging with the at least one first mounting slot for detachably mounting the first stamping plate on the first side wall of the container.

15. The auxiliary tool, as recited in claim 14, wherein the auxiliary tool further comprises a second stamping plate detachably attached on the second side wall of the container, the second stamping plate having a plurality of positioning grooves indently and spacedly formed on the second stamping plate.

16. The auxiliary tool, as recited in claim 15, wherein the second stamping plate has a third plate member and a fourth plate member integrally extending from the third plate member to form a substantially L-shaped structure, the positioning grooves being spacedly formed on the third plate member and the fourth plate member.

17. The auxiliary tool, as recited in claim 16, wherein each of the third plate member and the fourth plate member is divided into an outer portion, an inner portion and a mid portion formed between the outer portion and the inner portion, the second stamping plate further comprising a plurality of second positioning blocks protruding from the third plate member and the fourth plate member, wherein each positioning groove of the second stamping plate is formed between each two adjacent second positioning blocks.

18. The auxiliary tool, as recited in claim 17, wherein the auxiliary tool further comprises a second connector arranged to detachably connect the second stamping plate to the container, the second connector comprising at least one second protrusion formed on one of an inner surface of the second stamping plate, an outer surface of the container, and at least one second mounting slot formed on the other of an inner surface of the second stamping plate and an outer surface of the container, the at least one second protrusion being positioned to correspond to that of the at least one second mounting slot so that the at least one second protrusion is capable of fittedly and detachably engaging with the at least one second mounting slot for detachably mounting the second stamping plate on the second side wall of the container.

* * * * *